(12) United States Patent
Borle et al.

(10) Patent No.: US 11,677,743 B2
(45) Date of Patent: Jun. 13, 2023

(54) ETHERNET KEY

(71) Applicant: Fortinet, Inc., Sunnyvale, CA (US)

(72) Inventors: Sandip Y. Borle, Cupertino, CA (US); Joseph R. Mihelich, Folsom, CA (US)

(73) Assignee: Fortinet, Inc., Sunnyvale, CA (US)

( * ) Notice: Subject to any disclaimer, the term of this patent is extended or adjusted under 35 U.S.C. 154(b) by 224 days.

(21) Appl. No.: 15/718,957

(22) Filed: Sep. 28, 2017

(65) Prior Publication Data

US 2019/0097991 A1 Mar. 28, 2019

(51) Int. Cl.
*H04L 9/40* (2022.01)
*G06F 1/26* (2006.01)

(52) U.S. Cl.
CPC .......... *H04L 63/0853* (2013.01); *G06F 1/266* (2013.01); *H04L 63/0428* (2013.01); *H04L 63/062* (2013.01); *H04L 63/083* (2013.01)

(58) Field of Classification Search
CPC ..... G06F 1/266; G06F 1/182; H04L 63/0428; H04L 63/062; H04L 63/083; H04L 63/0853; H04L 41/08–082; H04L 63/08; H04L 63/0807; H04L 63/0823; H04L 63/0876; H04L 63/162
See application file for complete search history.

(56) References Cited

U.S. PATENT DOCUMENTS

| | | | | |
|---|---|---|---|---|
| 8,402,120 B1* | 3/2013 | Perkinson | ........... | H04L 41/0813 709/221 |
| 8,402,528 B1* | 3/2013 | McCorkendale | ......... | G06F 8/65 726/11 |
| 8,407,773 B1* | 3/2013 | Hayter | ..................... | H04L 67/51 726/7 |
| 8,443,065 B1* | 5/2013 | White | ................. | H04L 43/0811 709/222 |
| 2006/0085632 A1* | 4/2006 | Young | ..................... | H04L 67/02 713/100 |
| 2007/0171201 A1* | 7/2007 | Pi | ........................... | G06F 3/021 345/157 |
| 2013/0046993 A1* | 2/2013 | Jueneman | ............... | G06F 21/32 713/186 |

(Continued)

OTHER PUBLICATIONS

Paul Congdon, Link Layer Discovery Protocol and MIB v0.0, Mar. 7, 2002, IEEE 802.1 (Year: 2002).*

(Continued)

*Primary Examiner* — Jeremy S Duffield
(74) *Attorney, Agent, or Firm* — Law Office Of Dorian Cartwright; Dorian Cartwright

(57) ABSTRACT

A Compact computing device with peer-to-peer communication through an Ethernet interface is provided. According to one embodiment, a compact computing device includes an Ethernet interface, an Ethernet discovery agent, a memory and a micro-controller. The Ethernet interface is capable of connecting to a host though an Ethernet link. One side wall of the compact shielding case accommodates only the Ethernet interface. The Ethernet discovery agent is capable of discovering the host to which the compact computing device is connected. The memory is capable of storing information that is to be transferred to the host or information that is received from the host. The micro-controller is capable of exchanging information with the host through the Ethernet link.

11 Claims, 4 Drawing Sheets

(56) References Cited

U.S. PATENT DOCUMENTS

| | | | | |
|---|---|---|---|---|
| 2014/0173059 | A1* | 6/2014 | Koningstein | G06F 15/177 709/220 |
| 2014/0181248 | A1* | 6/2014 | Deutsch | H04L 49/354 709/217 |
| 2014/0298007 | A1* | 10/2014 | Rukmangathan | H04L 67/34 713/153 |
| 2016/0191308 | A1* | 6/2016 | Berry | H04L 41/0886 709/221 |
| 2017/0041349 | A1* | 2/2017 | Ylonen | H04L 63/062 |
| 2017/0273084 | A1* | 9/2017 | Yi | H04W 72/0453 |
| 2017/0302621 | A1* | 10/2017 | Kinoshita | H01Q 1/42 |

OTHER PUBLICATIONS

Paul Ridden, ASUS launches world's smallest router, Feb. 6, 2013, New Atlas New Technology and Science News (Year: 2013).*

J. Imtiaz, J. Jasperneite, K. Weber, F. Goetz and G. Lessmann, "A novel method for auto configuration of Realtime Ethernet Networks," 2008 IEEE International Conference on Emerging Technologies and Factory Automation, 2008, pp. 861-868, doi: 10.1109/ETFA.2008.4638498. (Year: 2008).*

M. Yokohata, T. Maeda and Y. Okabe, "An Extension of the Link Layer Discovery Protocol for On-Demand Power Supply Network by PoE," 2013, 2013 27th International Conference on Advanced Information Networking and Applications Workshops, Barcelona, Spain, pp. 1612-1616. (Year: 2013).*

* cited by examiner
ETHERNET KEY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of computing device communications. In particular, various embodiments relate to a compact computing device with peer-to-peer communication through an Ethernet interface.

Description of the Related Art

Network appliances, such as network switches and network firewalls, may have configurations that are dependent on networks in which these appliances are deployed. Some network appliances may have multiple operating modes that may have different functions or managements. At the time a network appliance is shipped from the manufacturer, it may be configured to operate in a default mode that may have very limited functionality. When the network appliance is deployed within the target private network, the network appliance should be initialized with the configurations in accordance with the network's policies. However, it is not always easy for the network administrator to initialize the new appliance. For example, when a new network switch that has a default 'local' mode is deployed within a remote site of a private network, it cannot be configured by a network administrator from a central site before it is changed to a 'centrally-managed' mode. Usually, a Universal Serial Bus (USB) key that contains a token of the private network may be plugged into a USB port of the switch and the switch may change its operating mode after a legitimate USB key is detected. However, some network appliances do not come equipped with a USB port and therefore cannot use a USB key for initialization. Since almost all network appliances comprise one or more Ethernet ports and some network appliances support Power-over-Ethernet (PoE), there is a need for an Ethernet key that can be connected to an Ethernet Port of a network appliance and provide commands and/or configurations to host devices.

SUMMARY

A compact computing device with peer-to-peer communication through an Ethernet interface is provided. According to one embodiment, a compact computing device includes an Ethernet interface, an Ethernet discovery agent, a memory and a micro-controller. The Ethernet interface is capable of connecting to a host though an Ethernet link. One side wall of the compact shielding case accommodates only the Ethernet interface. The Ethernet discovery agent is capable of discovering the host to which the compact computing device is connected. The memory is capable of storing information that is to be transferred to the host or information received from the host. The micro-controller is capable of exchanging information with the host through the Ethernet link.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
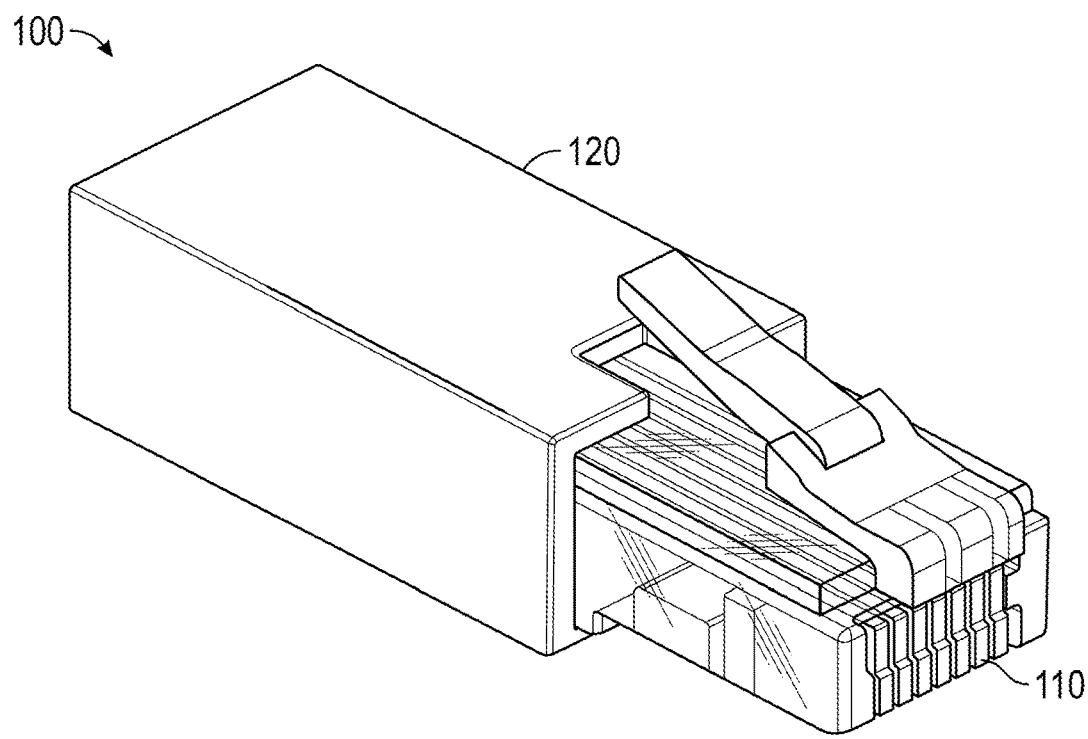
FIG. 1 illustrates an external structure of an Ethernet key in accordance with an embodiment of the present invention.

A compact computing device with peer-to-peer communication through an Ethernet interface is provided. According to one embodiment, a compact computing device includes an Ethernet interface, an Ethernet discovery agent, a memory and a micro-controller. The Ethernet interface is capable of connecting to a host though an Ethernet link. One side wall of the compact shielding case accommodates only the Ethernet interface. The Ethernet discovery agent is capable of discovering the host to which the compact computing device is connected. The memory is capable of storing information that is to be transferred to the host or information that has been received from the host. The micro-controller is capable of exchanging information with the host through the Ethernet link.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and antispam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an external structure of a compact computing device 100 in accordance with an embodiment of the present invention. In this example, compact computing device 100 is an Ethernet key or an Ethernet token with a male Ethernet connector 110 and a shielding case 120. The male Ethernet connector is a registered jack 45 (RJ45) connector that can be plugged directly into a host's Ethernet port. Shielding case 120 has a compact footprint that accommodates only the RJ45 connector at one side wall and houses a small printed circuit board (PCB) on which a micro-controller, a memory and male Ethernet connector 110 are mounted. When Ethernet key 100 is plugged directly into an Ethernet port of a host, e.g., a network switch, a network router or a network security device, both devices can discover its peer through a network device discovery protocol and exchange media access control (MAC) addresses as well as other network configuration information with its peer. After that, the host may start communicating with Ethernet key 100 by exchanging layer 2 frames and fetch a token or other information stored on Ethernet key 100.

Figure 2:
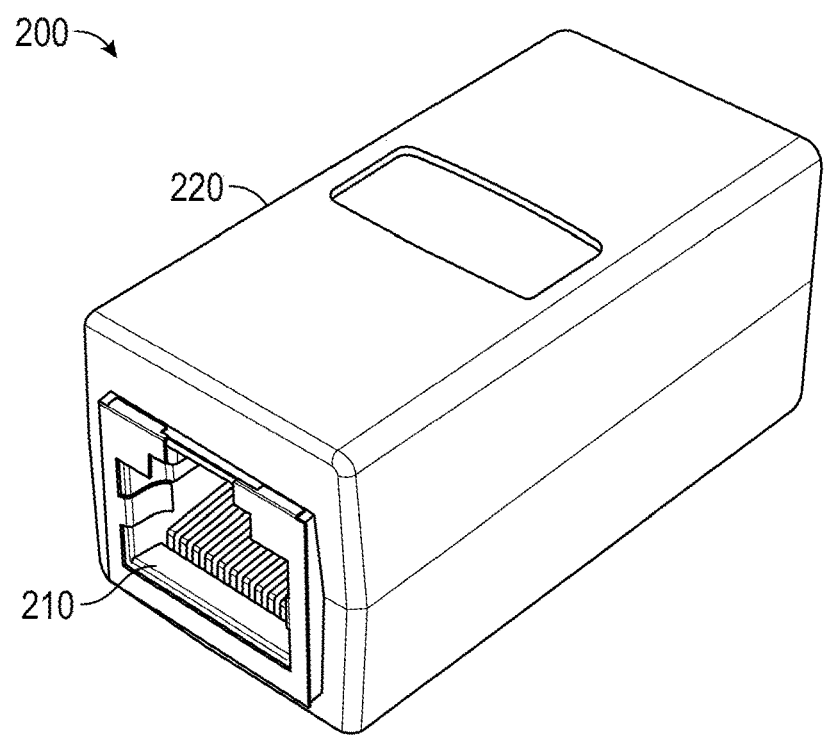
FIG. 2 illustrates an external structure of an Ethernet key in accordance with another embodiment of the present invention.

FIG. 2 illustrates an external structure of an Ethernet key 200 in accordance with another embodiment of the present invention. In this example, Ethernet key 200 comprises a female Ethernet socket 210 and a shielding case 220. Ethernet key 200 may be connected to a host's Ethernet port by an Ethernet cable (not shown). The footprint of shielding case 220 is large enough to simply house female Ethernet socket 210 and other components of Ethernet key 200 (as described above with reference to FIG. 1).

Figure 3:
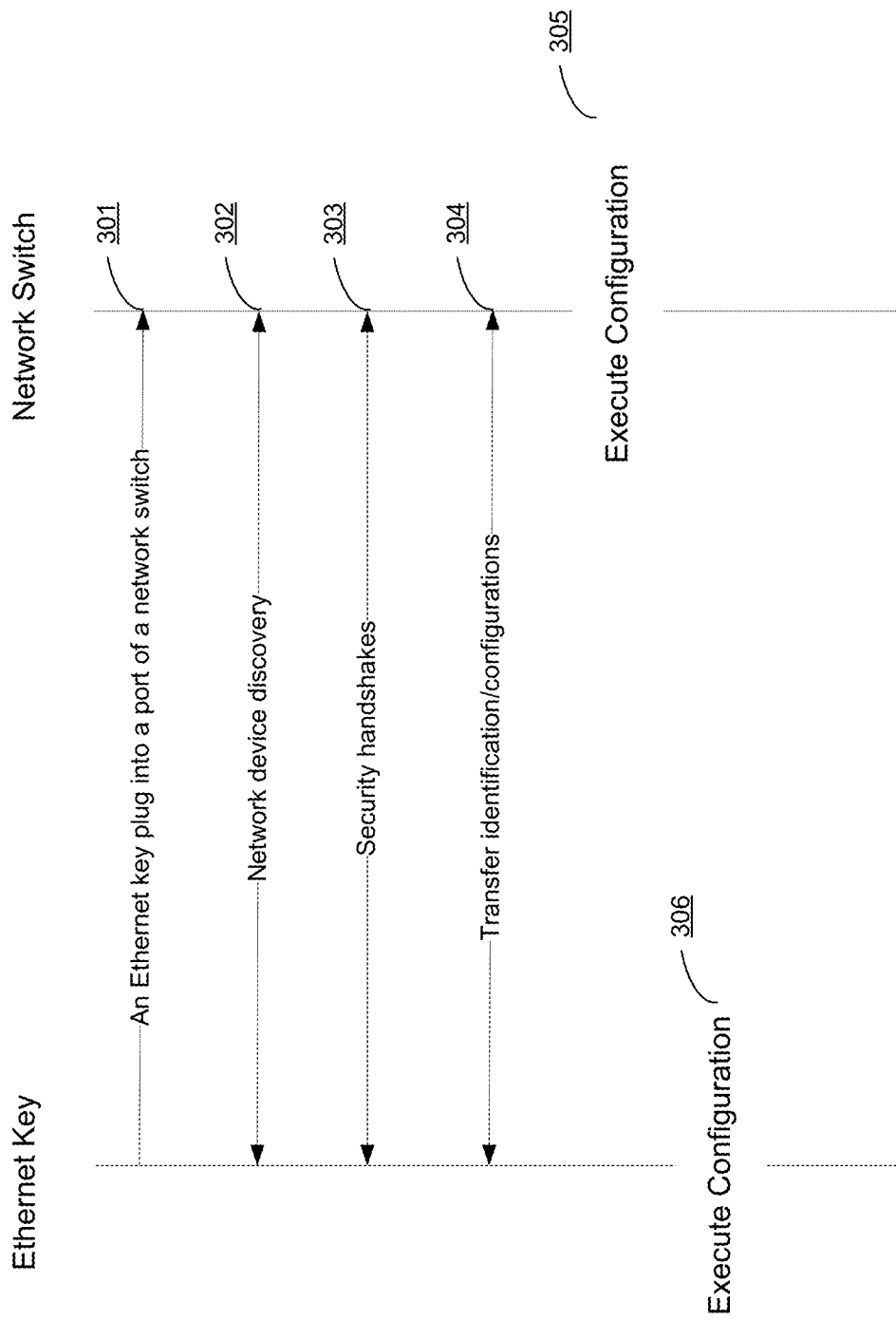
FIG. 3 is a flow diagram illustrating a method for configuring a network device using an Ethernet key in accordance with an embodiment of the present invention.

FIG. 3 is a flow diagram illustrating a method for configuring a network switch using an Ethernet key in accordance with an embodiment of the present invention.

At step 301, an Ethernet key is plugged into a port of a network switch. In one embodiment, the Ethernet key has a male Ethernet connector as shown in FIG. 1 and it can be directly plugged into a port of the network switch. In another embodiment, both the Ethernet key and network switch have Ethernet ports and they can be directly connected by an Ethernet cable. In a further embodiment, both the Ethernet key and the network switch can be connected to a local area network (LAN) and connected through other network switches.

At step 302, the Ethernet key and the network switch can find each other through a link layer discovery protocol (LLDP). For example, an LLDP agent of the network switch may send LLDP information to a constrained multicast address on the Ethernet at regular intervals. An LLDP agent of the Ethernet key may receive the LLDP information multicasted by the network switch and send LLDP information about itself back to the network switch. After the LLDP discovery, both the Ethernet key and the network switch know the MAC address and other network information of its peer and may start communication on Layer 2. The LLDP and other layer 2 device discovery protocols are well known to those skilled in the art. As such, further description thereof is omitted for sake of brevity.

At step 303, optionally, the Ethernet key and the network switch may start a security handshake in order to authenticate its peer as a legitimate device. For example, the Ethernet key and the network switch may exchange their digital signatures that may include the manufacturer ID and product ID. If the identification information of its peer can be verified, then the peers can start exchange of configuration information.

At step 304, the network switch may fetch configurations from the Ethernet key and then execute the configurations at step 305. For example, the network switch, such as a FortiSwitch secure access switch available from the assignee of the present invention, is a new network switch with factory default configurations. When the network switch is deployed within a private network, the Ethernet key, which stores a configuration file defined by the administrator of the private network, is plugged into the network switch. The network switch can retrieve the configuration file from the Ethernet key and execute it to initialize the network switch. The network switch may reboot after the initialization and work as required within the context of the private network. Optionally, the configuration file stored in the Ethernet key may be encrypted to prevent it from interception or tampering. The network switch may decrypt the encrypted configuration file after it is retrieved from the Ethernet key.

In another example, when a new network switch is deployed within a private network, an Ethernet key with a token of the network switch is plugged into a port of the network switch. The network switch retrieves the token from the Ethernet key. The token is then sent to a network management appliance or service, e.g., a FortiManager centralized device manager or the FortiCloud hosted security management service available from the assignee of the present invention. Responsive to receipt of the token, the network management appliance or service may retrieve a configuration file that corresponds to the token of the network switch and transfer the configuration file back to the network switch. The network switch may execute the configuration file for initialization. After rebooting, the network switch may work as required within the context of the private network.

At step 306, the Ethernet key may be disconnected from the network switch after the network switch is initialized.

Although the above example shows that the Ethernet key works as a read-only device in which the configuration file(s) or token of the network switch cannot be modified, those skilled in the art will appreciate that the Ethernet key may be used for storing information received from a host device. For example, the Ethernet key may work as an external storage drive for a host device to which it is connected.

Figure 4:
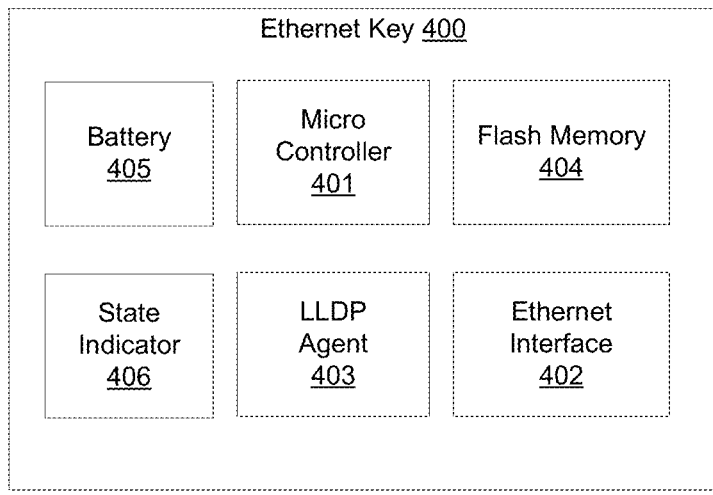
FIG. 4 illustrates exemplary functional units of an Ethernet key in accordance with an embodiment of the present invention.

FIG. 4 illustrates exemplary functional units of an Ethernet key 400 in accordance with an embodiment of the present invention. In this example, Ethernet key 400 comprises a micro-controller 401, an Ethernet interface 402, an LLDP agent 403, a flash memory 404, a battery 405 and a state indicator 406.

Micro-controller 401 is used for running software programs to control the operations of Ethernet key 400. Micro-controller 401 may communicate with a host and exchange information with a host through Ethernet interface 402 after Ethernet key 400 is connected to the host. Micro-controller 401 may also control the security of Ethernet key 400 by authenticating whether the host device is legitimate and may encrypt/decrypt the information exchanged with the host device.

Ethernet interface 402 is used for providing Ethernet connectivity with other Ethernet-enabled network devices. Ethernet interface 402 may be a male Ethernet connector, such as RJ45, or a female Ethernet port that can be connected to another network device by an Ethernet cable.

LLDP agent 403 is a module that is capable of discovering neighbor network devices through a link layer discovery protocol or other similar protocols. In one example, LLDP agent 403 may operate in LLDP receive only mode and receive an LLDP Ethernet frame multicasted by a host device through Ethernet interface 402 after Ethernet key 400 is connected to the host device. LLDP agent 403 then retrieves LLDP information of the host device, including the MAC address of the host device, from the LLDP Ethernet frame and stores the information for later communication. In another example, LLDP agent 403 may operate in transmit only mode or transmit and receive mode and may multicast its LLDP information to the host device to which Ethernet key 400 is connected.

Flash memory 404 is used for storing information that is to be transferred to the host device. In one example, configuration files that are used for configuring network devices of a private network are stored in flash memory 404. In another example, an identification/token that can be recognized by a network management appliance or service may be stored in flash memory 404. The identification/token may be retrieved by a host device and used for identifying the host device. The configuration files and the identification/token may be encrypted for security reasons. After LLDP agent 403 discovers the host device, micro-controller 401 may start a security handshake with the host device. If the host device is authenticated as a legitimate device, micro-controller 401 may transfer the token or configuration files stored in flash memory 404 to the host device or allow the host device to fetch the information from flash memory 404 through the Ethernet link between Ethernet key 400 and the host device. In a further example, information received from a host device may be stored in flash memory 404 and Ethernet key 400 may operate as an external storage drive of the host device.

Battery 405 is optionally used for providing power supply to Ethernet key 400. Ethernet key 400 may be switched on and then plugged in a host device. Ethernet key 400 and the host device may discover each other and exchange information as mentioned above. In another example, Ethernet interface 402 may include circuitry that is capable of drawing electrical power from a PoE port of a host device. In this case, Ethernet key 400 may be turned on automatically when Ethernet key 400 is plugged in a PoE port of a host.

State indicator 406 is optionally used for indicating the status of Ethernet key 400. For example, LED lights of state indicator 406 may use different colors or blinking patterns to indicate the states of battery 405 and/or Ethernet key 400.

Figure 5:
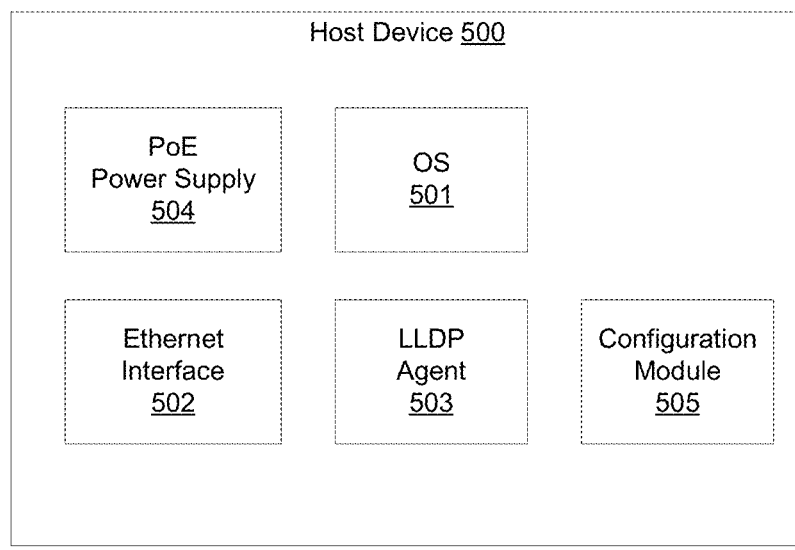
FIG. 5 illustrates exemplary functional units of a network device in accordance with an embodiment of the present invention.

FIG. 5 illustrates exemplary functional units of a host device 500 in accordance with an embodiment of the present invention. In this example, host device 500 is a network device, such as a FortiSwitch secure access switch, a FortiGate network security appliance, a FortiWeb web application firewall or a FortiMail messaging security appliance available from the assignee of the present invention, that can be configured with network policies of a private network. Host device 500 comprises an operating system (OS) 501, an Ethernet interface 502, an LLDP agent 503, a PoE power supply 504 and a configuration module 505.

OS 501 is used for controlling the operation of software and hardware of host device 500. When host device 500 is shipped from its manufacturer, it is configured with factory default configurations. When host device 500 is deployed within a private network and OS 501 is booted for the first time, host device 500 may be initialized by importing configurations and/or network policies of the private network from an Ethernet key or a network management appliance or service.

LLDP agent 503 is used for discovering an Ethernet key that is plugged directly into Ethernet interface 502 or connected to Ethernet interface 502 via an Ethernet cable. In one example, LLDP agent 503 operates in transmit only mode or transmit and receive mode and it may multicast an LLDP Ethernet frame periodically on Ethernet interface 502. In an LLDP Ethernet frame that is multicasted by LLDP agent 503, the source address is the MAC address of the Ethernet interface 502 and other network information of host device 500 that is necessary for peer-to-peer layer 2 communication may be included in a link layer discovery protocol data unit (LLDPDU). When an Ethernet key is plugged in Ethernet interface 502, the LLDP agent of the Ethernet key receives the LLDP Ethernet frame and extracts the network information of host device 500, including the MAC address of host device 500, from the LLDP Ethernet frame. In another example, LLDP agent 503 may operate in LLDP receive only mode and receive LLDP Ethernet frame multicasted by an Ethernet key through Ethernet interface 502 after the Ethernet key is connected to host device 500. LLDP agent 503 then retrieves information of the Ethernet key, including the MAC address of the Ethernet key, from the LLDP Ethernet frame and stores the information for later communication.

PoE power supply 504 is optionally used to provide electrical power to an Ethernet key when the Ethernet key is connected to Ethernet interface 502.

Configuration module 505 is used for retrieving configuration files from the Ethernet key and executing the configuration files in order to initialize host device 500. Configuration module 505 may also authenticate the Ethernet key before retrieving configuration files. For example, configuration module 505 may retrieve a device signature of the Ethernet key and determine whether the Ethernet key is from a legitimate manufacturer. In another example, configuration module 505 may retrieve an identification or token of a private network from the Ethernet key and send this identification to a network management appliance or service associated with the private network. The network management appliance or service may then transmit configurations corresponding to the identification back to configuration module 505. After the configurations are retrieved from the Ethernet key or the network management appliance/service, the configurations files are executed by configuration module 505 to initialize host device 500. Host device 500 may then be rebooted to finish the initialization process.

In another example, host device 500 may be a general-purpose computer with an Ethernet interface. An Ethernet key may be a security token to identify a user of the host device. The Ethernet key can be plugged into the Ethernet interface of the host device and discovered by an LLDP agent of the host device. The host device may read information, such as an identification/signature of the user, from the Ethernet key. In another example, the host device may write information to the flash memory of the Ethernet key through the Ethernet link to the Ethernet key. In this case, the Ethernet key may serve as external storage for the host device.

Figure 6:
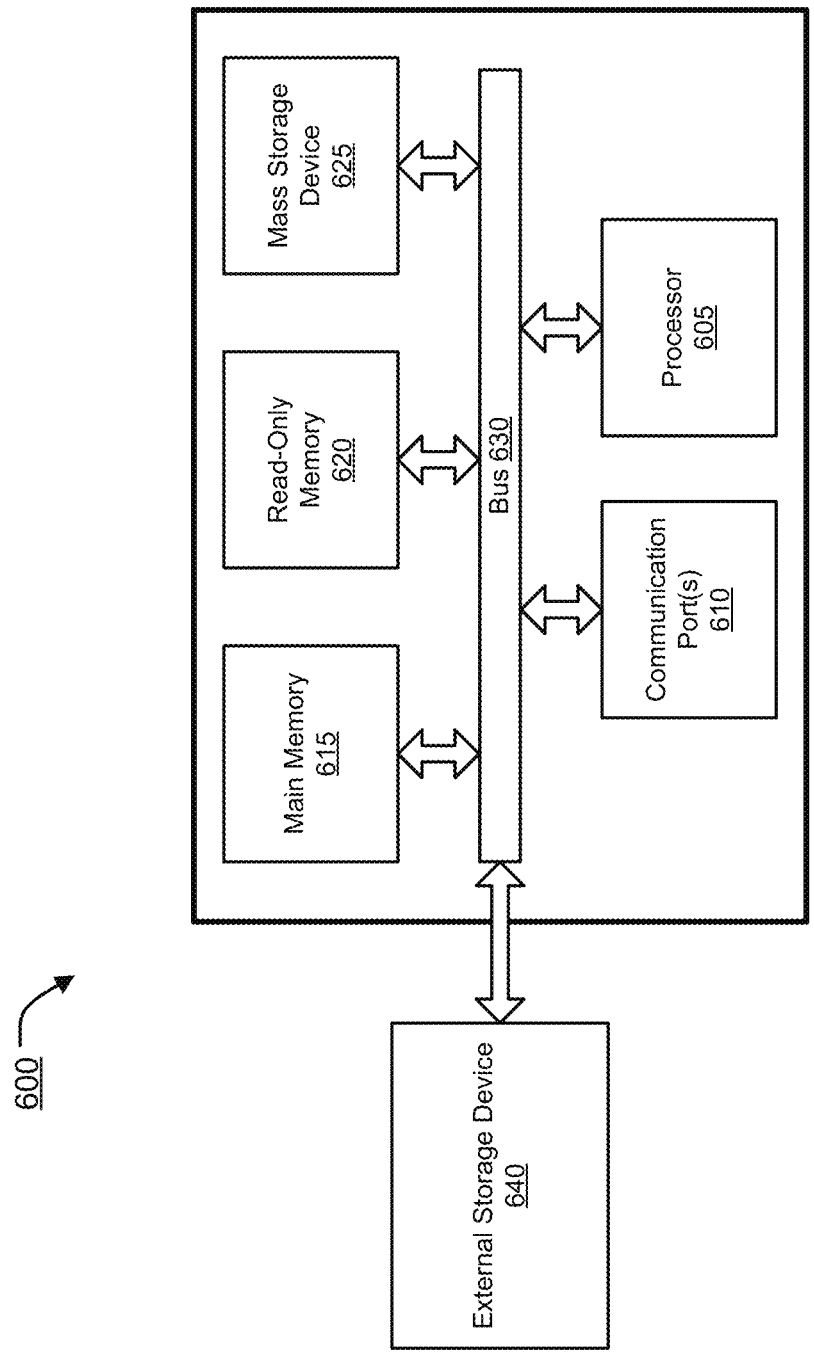
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a host device (e.g., host device 500), a network device (e.g., a switch or router), a network security device (e.g., a gateway, a firewall, a messaging security appliance, a web application firewall or a unified threat management (UTM) device), a server or a client workstation.

Embodiments of the present disclosure include various steps, which have been described in detail above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-ReWritable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A compact computing device without Universal Serial Bus (USB) port, comprising:
    an Ethernet interface through which communications are performed with a host associated with a private network via an Ethernet link, wherein the host is in a factory default configuration,
    wherein the Ethernet interface receives electrical power from the host using power-over-Ethernet (PoE);
    a compact shielding case, having a footprint is only large enough that one side wall of the compact shielding case simply accommodates only the Ethernet interface;
    an Ethernet discovery agent, which responsive to the Ethernet interface being coupled to the host discovers the host;
    a memory having stored therein information that is to be transferred to the host and operable to store information that is received from the host, wherein the information that is to be transferred to the host includes a token and configuration information that is used to identify the host to (i) a network management appliance or (ii) a network management service associated with the private network and enables the network management appliance or the network management service to cause the host to be initialized with the configuration information corresponding to the token that allows the host to be centrally managed by an administrator of the private network via the network management appliance or the network management service by providing the host with the configuration information; and
    a micro-controller to control exchange of the information with the host through the Ethernet link,
    wherein the Ethernet discovery agent uses link layer discovery protocol (LLDP) to discover the host by sending LLDP information to a constrained multicast address on the Ethernet at regular intervals, wherein an LLDP agent of the compact computing device receives the LLDP information and transmits information about itself back to the host in order for the compact computing device and the host to communicate via layer 2, wherein the LLDP agent discovers neighbors using LLDP, and
    wherein the micro-controller further authenticates the host during a security handshake process with the host based on a digital signature of the host received from the host via the Ethernet link.

2. The compact computing device of claim 1, wherein the information stored in the memory includes the configuration information of the host.

3. The compact computing device of claim 2, wherein the configuration of the host is encrypted.

4. The compact computing device of claim 1, further comprising a state indicator providing information indicative of a running state of the compact computing device.

5. The compact computing device of claim 1, wherein the digital signature includes one or more of a manufacturer identifier and a product identifier.

6. The compact computing device of claim 1, wherein, when executed by the host, the configuration information causes the factory default configuration of the host to be replaced with an initial configuration for use in connection with the private network.

7. The compact computing device of claim 6, wherein the host comprises a network switch.

8. The compact computing device of claim 6, wherein the host comprises a network security device.

9. The compact computing device of claim 8, wherein the network security device comprises a unified threat management (UTM) device.

10. A method in a compact computing device without Universal Serial Bus (USB) port, the method comprising:
performing communications, through an Ethernet interface, with a host associated with a private network via an Ethernet link, wherein the host is in a factory default configuration,
wherein the Ethernet interface receives electrical power from the host using power-over-Ethernet (PoE),
wherein the compact computing device comprises a compact shielding case having a footprint that is only large enough that one side wall of the compact shielding case simply accommodates only the Ethernet interface;
discovering the host by an Ethernet discovery agent of the compact computing device, which responsive to the Ethernet interface being coupled to the host discovers the host;
storing information in a memory that is to be transferred to the host and operable is to store information that is received from the host, wherein the information that is to be transferred to the host includes a token and configuration information that is used to identify the host to (i) a network management appliance or (ii) a network management service associated with the private network and enables the network management appliance or the network management service to cause the host to be initialized with the configuration information corresponding to the token that allows the host to be centrally managed by an administrator of the private network via the network management appliance or the network management service by providing the host with the configuration information; and
controlling, with a micro-controller, exchange of the information with the host through the Ethernet link,
wherein the Ethernet discovery agent uses link layer discovery protocol (LLDP) to discover the host by sending LLDP information to a constrained multicast address on the Ethernet at regular intervals, wherein an LLDP agent of the compact computing device receives the LLDP information and transmits information about itself back to the host in order for the compact computing device and the host to communicate via layer 2, wherein the LLDP agent discovers neighbors using LLDP, and
wherein the micro-controller further authenticates the host during a security handshake process with the host based on a digital signature of the host received from the host via the Ethernet link.

11. A non-transitory, computer-readable medium storing source code that, when executed, performs a method in a compact computing device without Universal Serial Bus (USB) port, the method comprising:
performing communications, through an Ethernet interface, with a host associated with a private network via an Ethernet link, wherein the host is in a factory default configuration,
wherein the Ethernet interface receives electrical power from the host using power-over-Ethernet (PoE),
wherein the compact computing device comprises a compact shielding case having a footprint that is only large enough that one side wall of the compact shielding case simply accommodates only the Ethernet interface;
discovering the host by an Ethernet discovery agent of the compact computing device, which responsive to the Ethernet interface being coupled to the host discovers the host;
storing information in a memory that is to be transferred to the host and operable is to store information that is received from the host, wherein the information that is to be transferred to the host includes a token and configuration information that is used to identify the host to (i) a network management appliance or (ii) a network management service associated with the private network and enables the network management appliance or the network management service to cause the host to be initialized with the configuration information corresponding to the token that allows the host to be centrally managed by an administrator of the private network via the network management appliance or the network management service by providing the host with the configuration information; and
controlling, with a micro-controller, exchange of the information with the host through the Ethernet link,
wherein the Ethernet discovery agent uses link layer discovery protocol (LLDP) to discover the host by sending LLDP information to a constrained multicast address on the Ethernet at regular intervals, wherein an LLDP agent of the compact computing device receives the LLDP information and transmits information about itself back to the host in order for the compact computing device and the host to communicate via layer 2, wherein the LLDP agent discovers neighbors using LLDP, and
wherein the micro-controller further authenticates the host during a security handshake process with the host based on a digital signature of the host received from the host via the Ethernet link.

* * * * *